US008576661B2

(12) United States Patent
Johnson et al.

(10) Patent No.: US 8,576,661 B2
(45) Date of Patent: Nov. 5, 2013

(54) DEVICE AND METHOD FOR IMAGING OF NON-LINEAR AND LINEAR PROPERTIES OF FORMATIONS SURROUNDING A BOREHOLE

(75) Inventors: Paul A. Johnson, Santa Fe, NM (US); James A. Tencate, Los Alamos, NM (US); Pierre-Yves Le Bas, Los Alamos, NM (US); Robert Guyer, Reno, NV (US); Cung Khac Vu, Houston, TX (US); Christopher Skelt, Houston, TX (US)

(73) Assignee: Chevron U.S.A. Inc., Sam Ramon, CA (US)

(*) Notice: Subject to any disclaimer, the term of this patent is extended or adjusted under 35 U.S.C. 154(b) by 445 days.

(21) Appl. No.: 12/893,530

(22) Filed: Sep. 29, 2010

(65) Prior Publication Data

US 2012/0075951 A1    Mar. 29, 2012

(51) Int. Cl.
*G01V 1/50* (2006.01)
*G01V 1/40* (2006.01)

(52) U.S. Cl.
USPC .................. 367/35; 367/31; 367/32; 181/105

(58) Field of Classification Search
USPC ........................... 367/25, 32, 35, 31; 181/105
See application file for complete search history.

(56) References Cited

U.S. PATENT DOCUMENTS

| 3,302,745 A | 2/1967 | Ikrath |
| 3,974,476 A | 8/1976 | Cowles |
| 4,382,290 A | 5/1983 | Havira |
| 5,144,590 A | 9/1992 | Chon |
| 5,398,215 A * | 3/1995 | Sinha et al. ...................... 367/31 |
| 5,521,882 A | 5/1996 | D'Angelo et al. |
| 5,719,823 A | 2/1998 | Earp |
| 6,009,043 A | 12/1999 | Chon et al. |

(Continued)

FOREIGN PATENT DOCUMENTS

| EP | 1122558 A1 | 8/2001 |
| GB | 2404983 A | 2/2005 |
| SU | 913303 A | 3/1982 |

OTHER PUBLICATIONS

International Search Report and Written Opinion for PCT International Patent Application No. PCT/US2009/047934 mailed Dec. 1, 2009.

(Continued)

*Primary Examiner* — Ian Lobo
(74) *Attorney, Agent, or Firm* — Pillsbury Winthrop Shaw Pittman LLP

(57) ABSTRACT

In some aspects of the disclosure, a method and an apparatus is disclosed for investigating material surrounding the borehole. The method includes generating a first low frequency acoustic wave within the borehole, wherein the first low frequency acoustic wave induces a linear and a nonlinear response in one or more features in the material that are substantially perpendicular to a radius of the borehole; directing a first sequence of high frequency pulses in a direction perpendicularly with respect to the longitudinal axis of the borehole into the material contemporaneously with the first acoustic wave; and receiving one or more second high frequency pulses at one or more receivers positionable in the borehole produced by an interaction between the first sequence of high frequency pulses and the one or more features undergoing linear and nonlinear elastic distortion due to the first low frequency acoustic wave to investigate the material surrounding the borehole

40 Claims, 8 Drawing Sheets

Example arrangement for investigating cracks and other damage that run parallel or sub-parallel to the borehole

(56) References Cited

U.S. PATENT DOCUMENTS

| | | | |
|---|---|---|---|
| 6,175,536 B1 * | 1/2001 | Khan | 367/32 |
| 6,216,540 B1 | 4/2001 | Nelson et al. | |
| 6,440,075 B1 | 8/2002 | Averkiou | |
| 6,631,783 B2 * | 10/2003 | Khan | 181/108 |
| 6,704,247 B1 | 3/2004 | Ruffa | |
| 7,301,852 B2 | 11/2007 | Leggett, III et al. | |
| 7,463,551 B2 * | 12/2008 | Leggett et al. | 367/32 |

OTHER PUBLICATIONS

International Search Report and Written Opinion for PCT International Patent Application No. PCT/US2009/047184, mailed Dec. 21, 2009.

Westervelt, "Parametric Acoustic Array", The Journal of the Acoustical Society of America, vol. 35, No. 4, Apr. 1963, pp. 535-537.

Johnson et al., "Nonlinear Generation of Elastic Waves in Crystalline Rock", Journal of Geophysical Research, vol. 92, No. B5, Apr. 10, 1987, pp. 3597-3602.

Ostrovsky et al., "Dynamic Nonlinear Elasticity in Geomaterials", Rivista del Nuovo Cimento, vol. 24, No. 7., 2001.

Johnson et al., "Nonlinear Generation of Elastic Waves in Granite and Sandstone: Continuous Wave and Travel Time Observations", Journal of Geophysical Research, vol. 94, No. B12, Dec. 10, 1989, pp. 17,729-17,733.

Jones et al., "Interaction of Elastic Waves in an Isotropic Solid", The Journal of the Acoustical Society of America, vol. 35, No. 1, Jan. 1963, pp. 5-10.

Rollins et al., "Ultrasonic Study of Three-Phonon Interactions. II. Experimental Results", Physical Review, vol. 136, No. 3A, Nov. 1964, pp. 597-601.

Korneev et al., "Nonlinear Interaction of Plane Elastic Waves", Lawrence Berkeley National Laboratory Report LBNL-41914, 1998.

* cited by examiner

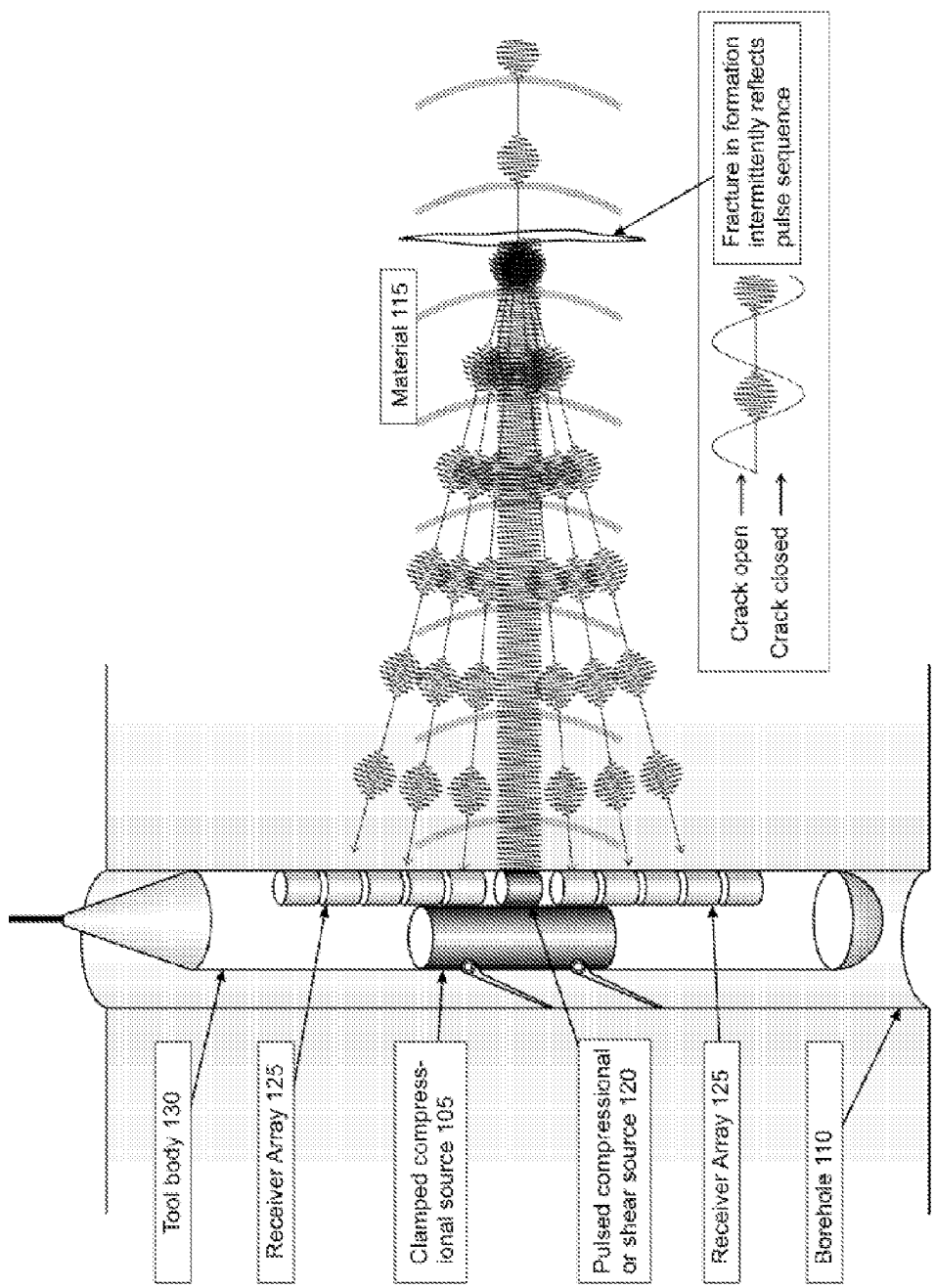
Figure 1. Example arrangement for investigating cracks and other damage that run parallel or sub-parallel to the borehole

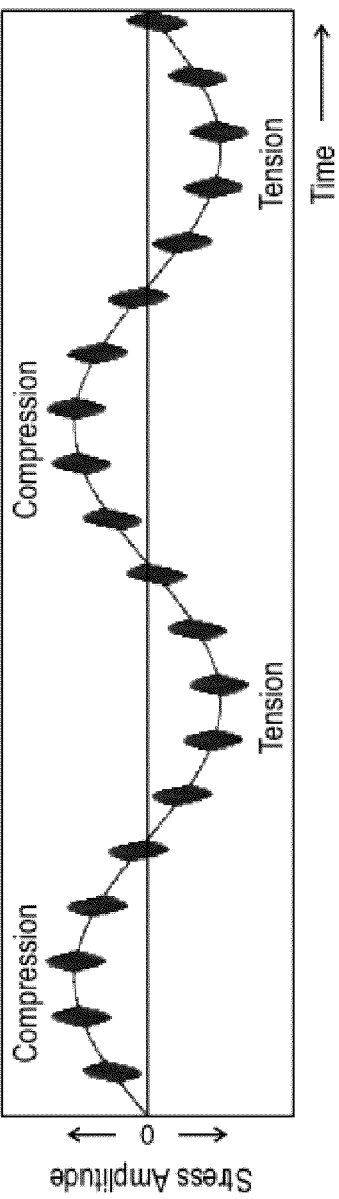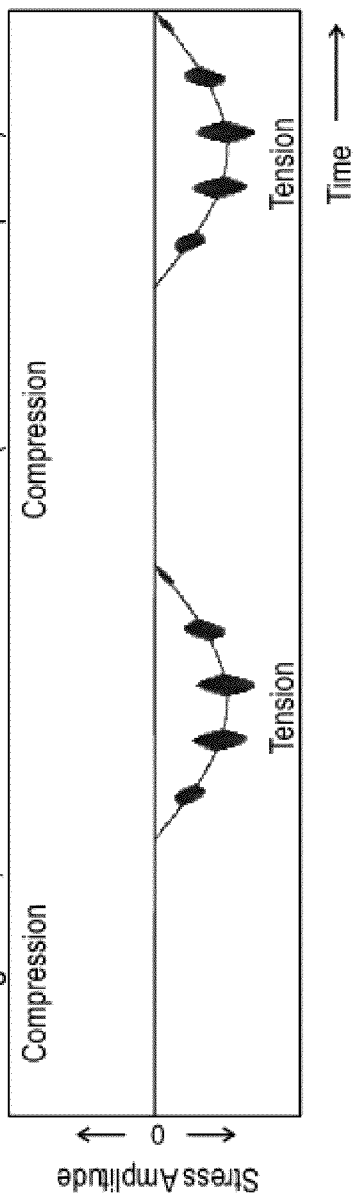

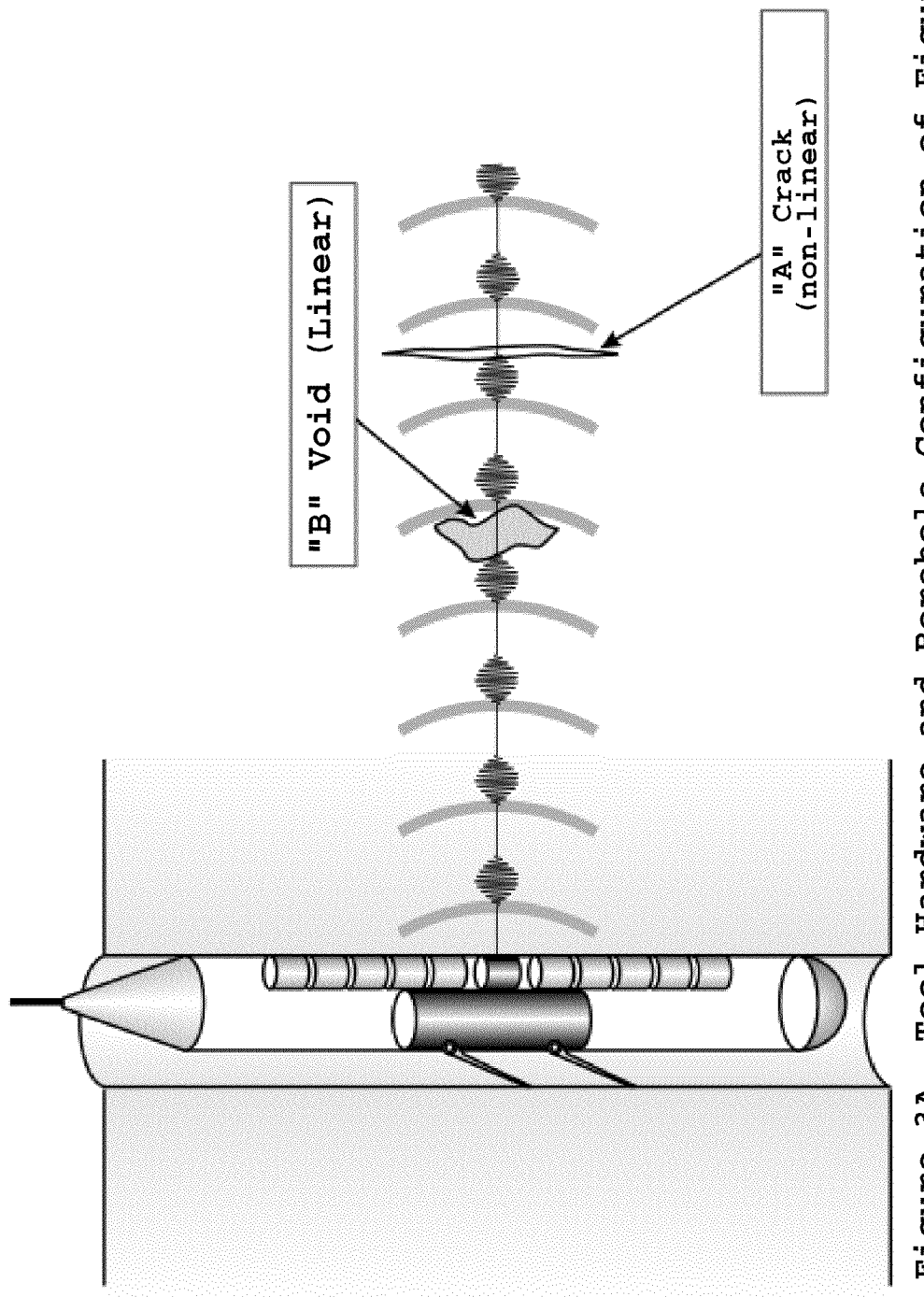
Figure 3A, Tool Hardware and Borehole Configuration of Figure 1

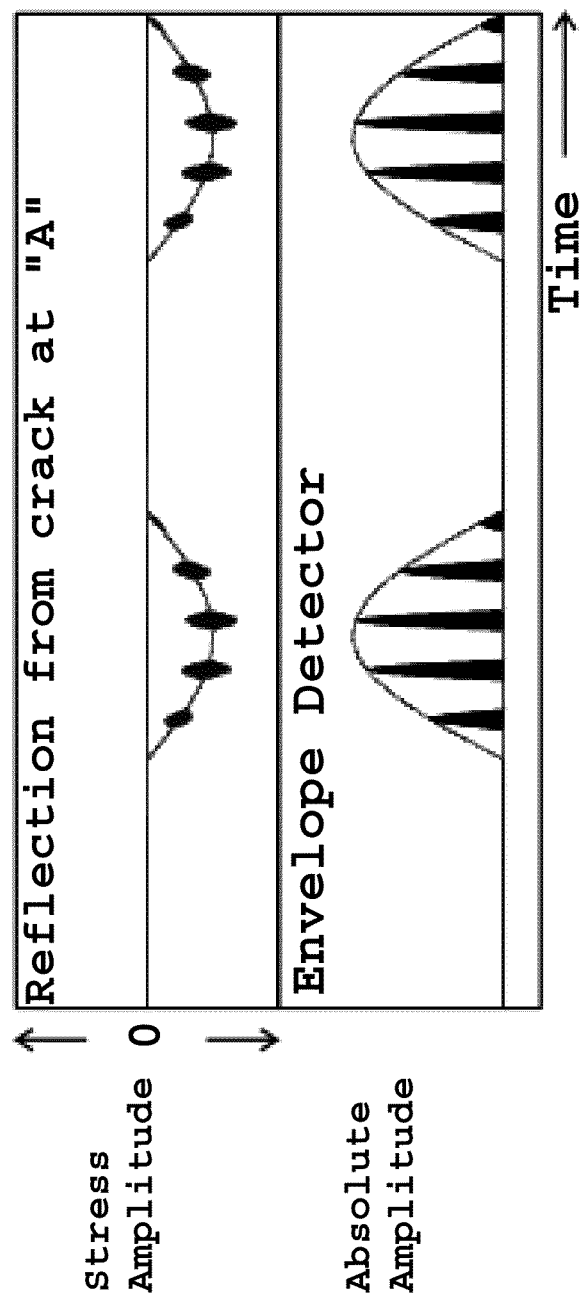
Figure 3b, Detection of Non-Linear Scatterer with Envelope Detector

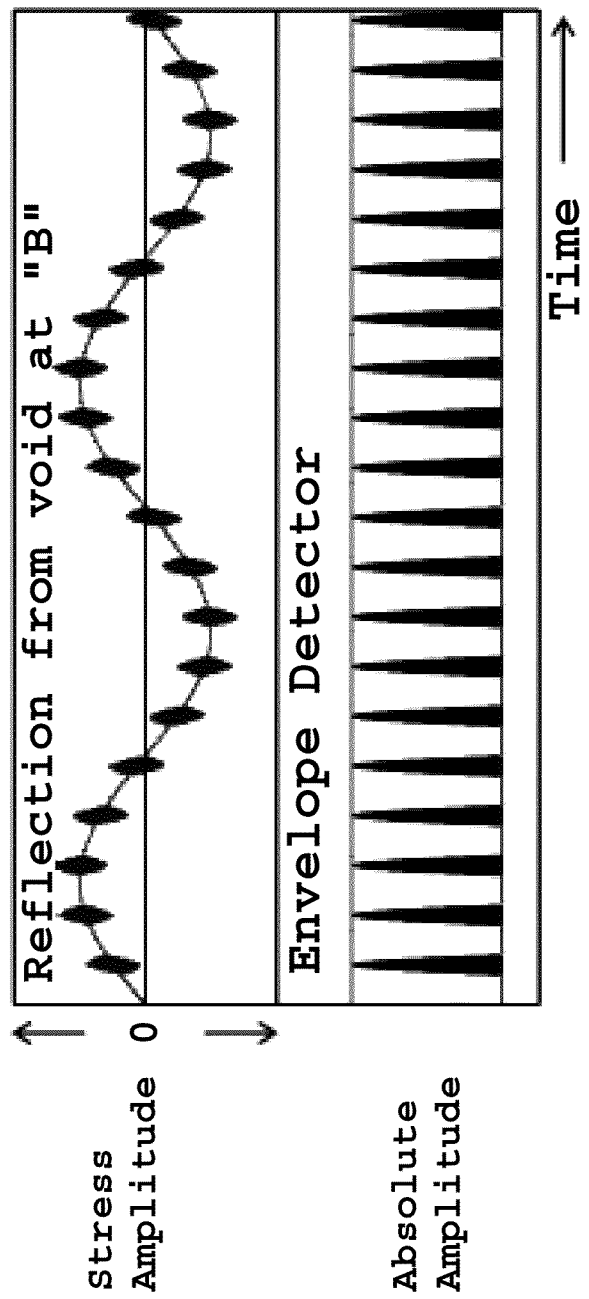
Figure 3c, Detection of Linear Scatterer with Envelope Detector

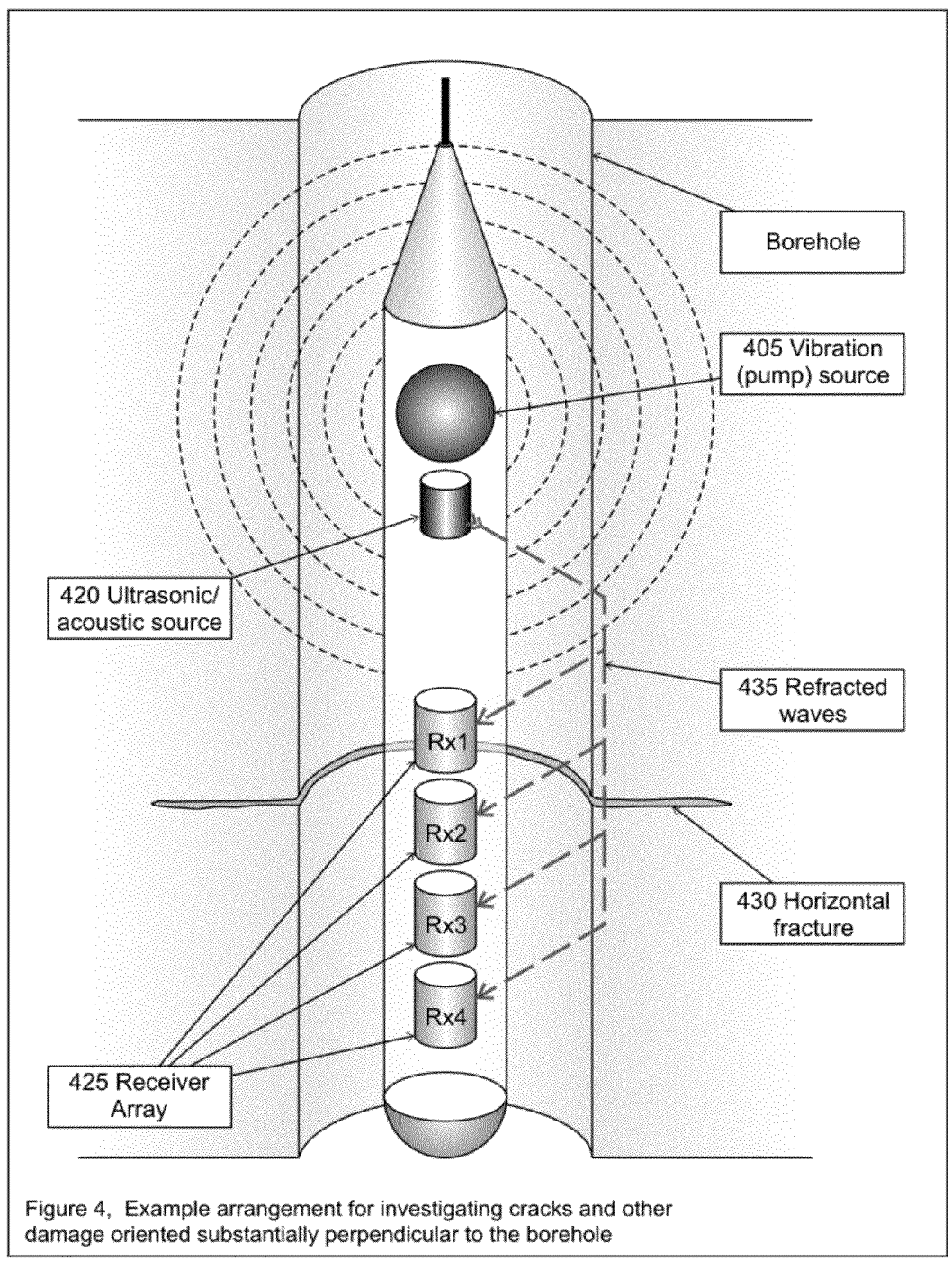
Figure 4. Example arrangement for investigating cracks and other damage oriented substantially perpendicular to the borehole

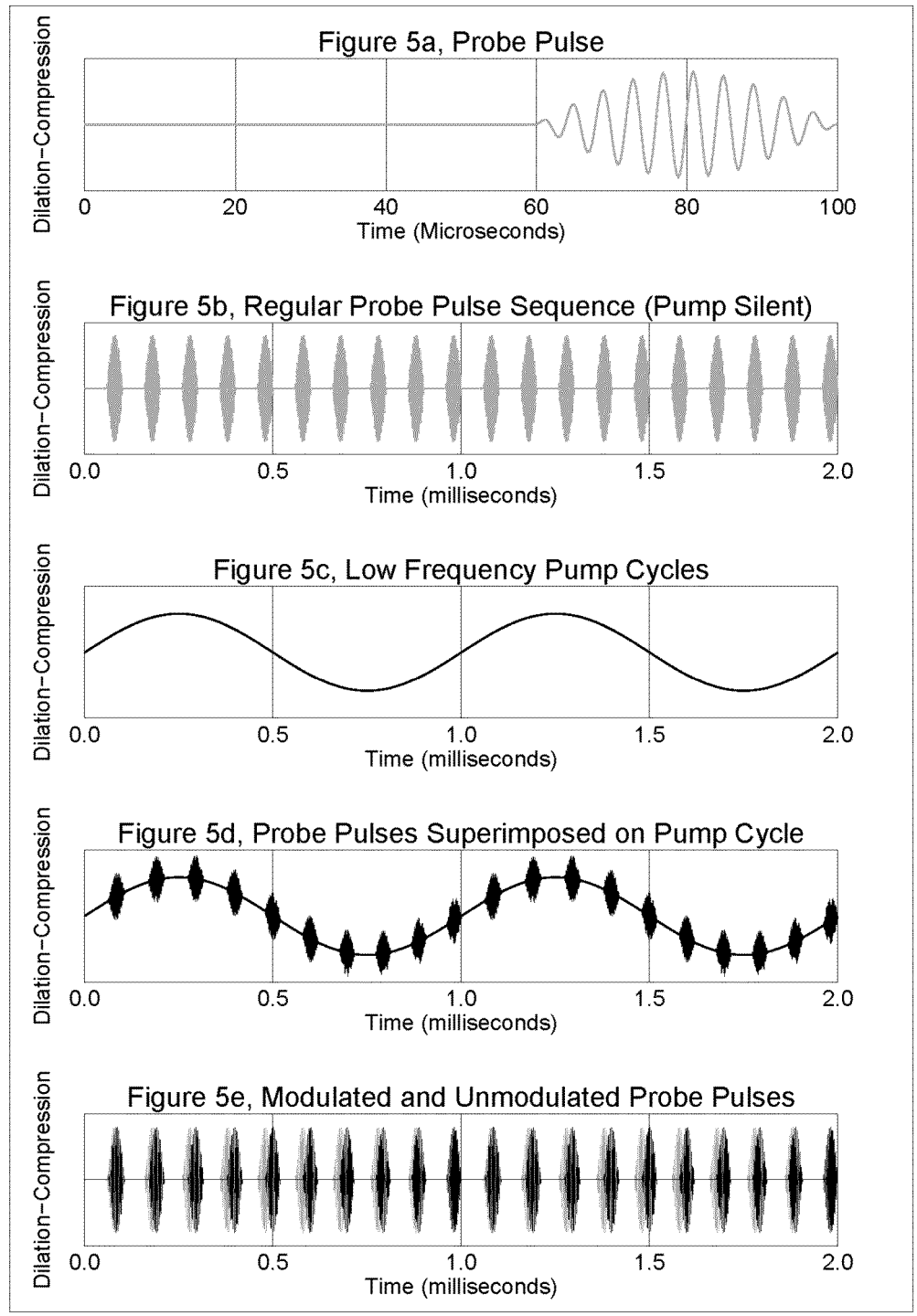

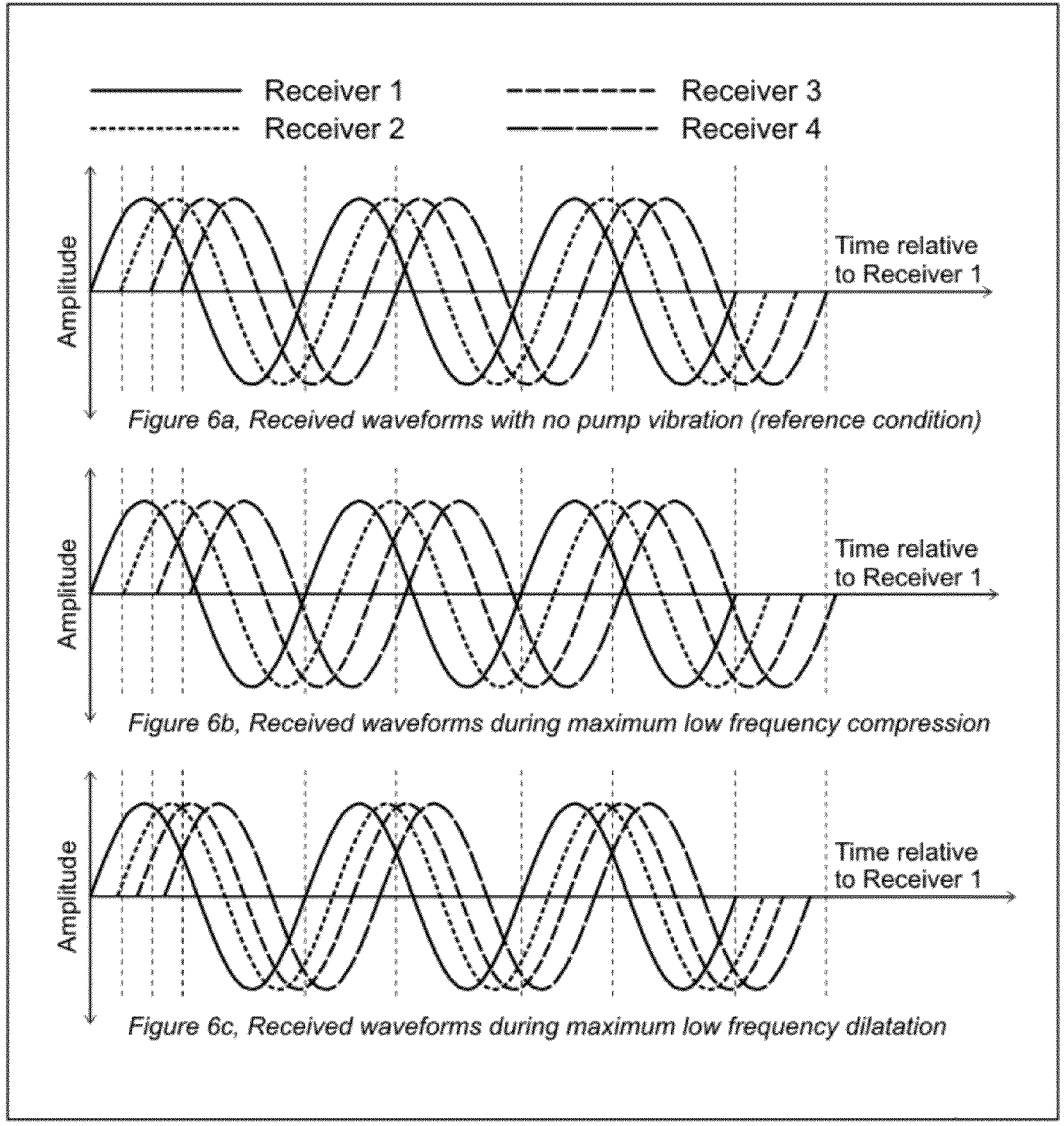

DEVICE AND METHOD FOR IMAGING OF NON-LINEAR AND LINEAR PROPERTIES OF FORMATIONS SURROUNDING A BOREHOLE

GOVERNMENT RIGHTS

This invention was made with Government support under Cooperative Research and Development Agreement (CRADA) Contract Number DE-AC52-06NA25396 awarded by the United States Department of Energy. The Government may have certain rights in this invention.

FIELD

The present disclosure relates generally to acoustic interrogation of rock formations around a borehole and more particularly to imaging of non-linear and linear properties of formation surrounding the borehole.

BACKGROUND

Detailed characterization of natural and induced fractures away from the borehole, reliable sequestration of $CO_2$, assessing mechanical integrity and predicting borehole breakout in oil and gas reservoirs, and probing cement integrity require new approaches to material characterization and imaging. Among the existing probes of material elasticity, the elastic nonlinear response (anelasticity) is an approach to probe material integrity. The elastic nonlinearity of a solid is a measure of the material mechanical damage state. Elastic nonlinear response tends to be the best measure of material damage. Thus, as a near-borehole probe, nonlinear methods hold the most promise for discerning mechanically damaged regions or potential crack/fracture conduits.

SUMMARY

In accordance with some aspects of the present disclosure, a method for investigating material surrounding a borehole is disclosed. The method includes generating a first low frequency acoustic wave within the borehole, wherein the first low frequency acoustic wave induces a linear and a nonlinear response in one or more features in the material that are substantially perpendicular to a radius of the borehole; directing a first sequence of high frequency pulses in a perpendicular direction with respect to the longitudinal axis of the borehole into the material contemporaneously with the first acoustic wave; and receiving one or more second high frequency pulses at one or more receivers positionable in the borehole produced by an interaction between the first sequence of high frequency pulses and the one or more features undergoing linear and nonlinear elastic distortion due to the first low frequency acoustic wave order to investigate the material surrounding the borehole.

In the method, the second high frequency pulses can be received at the one or more receivers if the first sequence of high frequency pulses encounters the one or more features within the material with a contrast in acoustic impedance that results in reflection or backscattering of energy to the borehole. In the method, the second high frequency pulses can be received at the one or more receivers if the first sequence of high frequency pulses encounters the one or more features that are oriented such that the one or more features directs energy back to the borehole while undergoing the distortion due to the first low frequency acoustic wave such that the distortion alters the contrast in the acoustic impedance during a cycle of the low frequency acoustic wave.

In the method, the first acoustic wave and the first sequence of high frequency pulses can be generated by a compressional wave source and/or a shear wave source. In the case that the first acoustic wave is from a shear wave source, one or more features in the material may experience crack shearing that will imprint a signature on the high frequency reflected pulses. In the case that the first acoustic wave is from a compressional wave source and the first sequence of high frequency pulses are shear waves the receivers will tend to receive reflected energy during the pump induced crack dilation in the one or more features. In some aspects, the source of the first acoustic wave can include a vibrating member that is configured to induce elastic nonlinearity in the material.

In the method, the one or more receivers can be arranged in an array in the borehole and can be configured to record one or more directional components of the one or more second high frequency pulses.

The method can include repeating the generating the first acoustic wave and the directing with the first sequence of high frequency pulses directed at different azimuth orientations and at different depths within the borehole to produce three-dimensional images of linear and nonlinear reflecting and backscattering features of the material surrounding the borehole. The material surrounding the borehole can include cement, casing, rock formations, fluids in or surrounding the borehole, disbonds in the cement/rock interface and/or the steel casing/cement interface. The received second high frequency pulses can have properties that depend on a phase of the low frequency wave at a location and a time at which the first sequence of high frequency pulses are reflected by the material.

The method can further include determining whether the material includes a linear reflector or a nonlinear reflector based on the received one or more second high frequency pulses. The method can also further include filtering the received one or more second high frequency pulses. The filter can include a high pass filter that can isolate high frequency components from the received one or more second high frequency pulses. Moreover, the method can include determining an amplitude change over time of the filtered one or more second high frequency pulses. The first sequence of high frequency pulses can be either chirped or coded or both chirped and coded. The first sequence of high frequency pulses can be modulated in amplitude, phase, and/or period.

In some aspects, the first sequence of high frequency pulses can have a frequency between about 10 to 1000 times that of the low frequency acoustic wave.

In some aspects, the method can include determining a radial distance to the one or more features using a first time, the time at which the first sequence of high frequency pulses were transmitted, and a second time, the time at which the second high frequency pulses were received, and an estimated velocity of sound of the material surrounding the borehole. The determination can include computing a cross-correlation of the first sequence of high frequency pulses and second high frequency pulses.

In some aspects, the second high frequency pulses can be received at the one or more receivers if the first sequence of high frequency pulses encounters a nonlinear elastic feature in the material that is oriented such that feature directs energy back while undergoing crack shearing.

In accordance with an aspect of the present disclose, an apparatus for investigating material surrounding a borehole is disclosed. The apparatus includes a first acoustic wave source, positionable in the borehole, configured to generate a first acoustic wave, having a low frequency, that induces a linear and a nonlinear response in one or more features in the material that are substantially parallel to a longitudinal axis of the borehole. The apparatus includes a source positionable in the borehole and configured to direct a first sequence of high frequency pulses perpendicular to the longitudinal axis of the borehole contemporaneously with the first acoustic wave. The apparatus includes one or more receivers positionable in the borehole and configured to receive one or more second high frequency pulses produced by an interaction between the first sequence of high frequency pulses and the material undergoing linear and nonlinear elastic distortion due to the first acoustic wave.

In some aspects, the second high frequency pulses can be received at the one or more receivers if the first sequence of high frequency pulses encounters the one or more features within the material with a contrast in acoustic impedance that results in reflection or backscattering of energy to the borehole. Moreover, the second high frequency pulses can be received at the one or more receivers if the first sequence of high frequency pulses encounters the one or more features that are oriented such that the one or more features directs energy back to the borehole while undergoing the distortion due to the first low frequency acoustic wave such that the distortion alters the contrast in the acoustic impedance during a cycle of the low frequency acoustic wave.

In some aspects, the first acoustic wave source, the source of the first sequence of high frequency pulses or both can be configured to produce a compressional wave, a shear wave or both. The first acoustic wave source can include a vibrating member that is configured to induce elastic nonlinearity in the material.

In some aspects, the one or more receivers can be arranged in an array in the borehole. Moreover, the one or more receivers can be configured to record one or more directional components of the one or more second high frequency pulses.

In some aspects, the apparatus can include a processor in communication with a memory having instructions which permit determination of a radial distance to the one or more features from the borehole. The apparatus can include a processor in communication with a memory having instructions which permit the construction of one or more three-dimensional images of the material based on repeated acoustic wave penetrations into the material at different azimuth orientations and at different depths within the borehole. The material surrounding the borehole can include cement, casing, rock formations, fluids in or surrounding the borehole, and/or disbonds in the cement/rock interface and/or the casing/cement interface. Further, the apparatus can include a processor in communication with a memory having machine executable instructions stored therein which, when executed cause the processor to determine the presence in the material of linear reflectors and/or a nonlinear reflectors based on the received one or more second high frequency pulses.

In some aspects, the apparatus can include a filter that is arranged to filter the received one or more second high frequency pulses. The filter can include a high pass filter that is arranged to isolate the high frequency components of the received one or more second high frequency pulses. In some aspects, the apparatus includes a processor that can be configured to determine the amplitude change over time of the filtered one or more second high frequency pulses.

In some aspects, the apparatus can include an encoder arranged to encode the first sequence of high frequency pulses with a time-varying signature by introducing chirps and/or frequency protocols. In some aspects, the apparatus includes a processor that can use the encoded first sequence of high frequency pulses to measure a time-of-flight between the first sequence of high frequency pulses and the received second high frequency pulses. The time-varying signature can include a change with time in an amplitude, a phase, and/or a period of the first sequence of high frequency pulses.

In some aspects, the first sequence of high frequency pulses have a frequency between about 10 to 1000 times that of the low frequency acoustic wave.

In some aspects, the radial distance is determined by computing a cross-correlation in a time domain with the first and the second sequences of high frequency pulses. The processor can be arranged to determine the radial distance to the material based upon a first time at which the first sequence of high frequency pulses were transmitted, a second time at which the second sequence of high frequency pulses where received and an estimated velocity of sound of the material.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 1 shows an example arrangement for investigating cracks and other damage in material that runs parallel or sub-parallel to the borehole in accordance with an aspect of the disclosure.

FIGS. 2a and 2b show an example interaction of the material surrounding the borehole to the low frequency acoustic wave, or "pump" wave and the sequence of high frequency pulses, or "probe" wave or pulses in accordance with aspects of the disclosure.

FIGS. 3a-3c show an example detection process used to distinguish between linear and nonlinear scatters in accordance with aspects of the disclosure.

FIG. 4 shows an example arrangement for investigating cracks and other damage that are oriented perpendicular or substantially perpendicular to the borehole in accordance with aspects of the disclosure.

FIGS. 5a-5e show an example graphic illustration of the operation of the arrangement of FIG. 4.

FIGS. 6a-6c show an example of received signals from the arrangement of FIG. 4.

DETAILED DESCRIPTION

FIG. 1 shows an example arrangement for investigating cracks and other damage in material surrounding the borehole that runs parallel or sub-parallel to the borehole. The borehole can be drilled in a variety of inclinations, such as vertical, inclined or horizontal, and embedded in a rock formation. As used herein, the term "sub-parallel" will mean almost parallel, but diverging or converging slightly. The material surrounding the borehole can include cement, casing, rock formations and/or various types of fluids such as drilling mud, completion fluid, formation water or hydrocarbon. One or more low frequency transducers 105 are arranged within borehole 110 to produces a low frequency acoustic wave or "pump" wave into material 115 surrounding borehole 110. The low frequency acoustic wave is sufficiently powerful to induce non-linear behavior in material 115 that has this characteristic. For example, the low frequency or "pump" wave can be between 1 Hz to 100 kHz. One or more high frequency transducers 120 are arranged within borehole 110 to contemporaneously produce a sequence of a high frequency pulses, or "probe" wave into material 115. This non-linear behavior refers to a non-linear dependence of elastic properties on the instantaneous strain state of the materials undergoing the strain. As a result of this non-linear response, the behavior of the high frequency pulses can be modified, for example, by a change in a pulse amplitude and/or a pulse velocity. Transducer 120 can be arranged to generate pulses at a high repetition rate. For example, transducer 120 can be configured to have a repetition rate of between 5 to 100 times for each pump wave cycle and emits bursts of high frequency 10-100 times that of the pump. In some aspects, transducers 105, 120 or both can include a vibration source and can be either clamped or unclamped in the borehole 110.

In some aspects, both transducers 105 and 120 are arranged such that they generate the low frequency acoustic wave and the sequence of high frequency pulses, respectively, that propagate radially with respect to the longitudinal axis of borehole 110 into material 115. In some aspects, since the low frequency acoustic waves generated by transducer 105 tends to spread out more, only transducer 120 is oriented to generate the sequence of high frequency pulses radially into material 115.

In some aspects, one or more piezoelectric transducers can be used. If more than one transducer is used, they can be arranged in an array configuration. By way of non-limiting examples, the array configuration can be linear, circular, a filled circle or a square array. The transducers within the array can be divided into groups, such that a first group of transducers can be driven by a source at the low frequency and a second group of transducers can be driven by the source or by a different source at the higher frequency.

In some embodiments, one or more sources (not shown) can be used to produce signals to drive transducers 105 and/or 120. By way of a non-limiting example, the signals can be produced by a 2-channel signal generator. Similar signal or function generators may be used. Low frequency sources 105 and high frequencies sources 120 can be controlled by a controller (not shown) to emit their respective acoustic waves or pulses contemporaneously into material 115.

In some aspects, the low frequency wave and/or the high frequencies pulses can be broadband having a frequency range spread about the central frequency.

One or more receivers 125 can be positionable, such that they can be arranged within borehole 110 at either above, below or both low frequency sources 105, high frequency sources 120 or both. One or more of low frequency sources 105, high frequencies sources 120, and/or receivers 125 can be arranged in an array configuration within borehole 110. One or more low frequency sources 105, high frequencies sources 120, receivers 125 can be arranged on a common tool body 130 that can be raised or lowered within borehole 110. In some aspects, the one or more receivers 125 can be locked to a side of the borehole and may record three components of wave particle motion so that the nonlinear feature azimuth can be inferred.

In this arrangement, the low frequency (pump) wave and the high frequency pulses (probe) both travel perpendicular to borehole 110 out into the material 115 surrounding borehole 110. If the pump wave has sufficient amplitude (generally greater than $10^{-6}$ strain amplitude), it will cause non-linear behavior, as discussed above, to be exhibited by cracks in material 115 that are oriented approximately perpendicular to radii of borehole 110. Transducer 120 is arranged to emit a sequence of high frequency pulses or bursts to probe for nonlinearity induced by the pump wave. If a crack is present, the low frequency or pump wave will cause the crack to close and open depending on the pump wave phase. During the compressional phase, the crack closes and the high frequency wave pass through the crack and does not return to borehole 110, since the closed crack does not exhibit any noticeable acoustical impedance contrast. During the dilatational phase, the crack is propped open briefly and the probe pulses are reflected back to borehole 110 to be detected by receiver 125 in borehole 110. The crack, while open, creates an acoustical impedance contrast. Cracks can be distinguished from other reflecting interfaces such as structural boundaries or voids, because only cracks create the nonlinear effect that depends on pump wave phase. An interface or void will reflect the probe pulses independent of the pump wave phase. In this manner cracks can be distinguished from interfaces, voids, intact bonds between cement and casing or formation, etc. Other nonlinear features such as disbonding between cement and a casing in the borehole, as well as the cement and surrounding formations can also be probed.

FIGS. 2*a* and 2*b* show an example interaction of the material surrounding the borehole to the low frequency acoustic wave, or "pump" wave produced by a compressional source and the sequence of high frequency pulses, or "probe" wave or pulses. In FIGS. 2*a* and 2*b*, stress amplitude of the rock formation (arbitrary units) is shown versus time (arbitrary units). The low frequency vibration oscillates a crack or a sequence of cracks in the formation causing the crack(s) to open during the wave dilation (tension) phase and to close during the wave compression phase. The high frequency pulses are emitted such that they are many pulses during each low frequency vibration cycle. If the low frequency vibration encounters a linear elastic feature such as a void or a layer interface, both the high frequency pulses and the low frequency waves are reflected back from the feature to the borehole, as shown by the in FIG. 2*a*. If a crack, series of cracks or a highly mechanically damaged region is encountered, the feature is activated by its intrinsic nonlinearity. When the crack is under compression from the effect of the vibration, the high and low frequency signals pass through it, not sensing the crack. When the crack is under tension from the dilatational portion of the vibration, the high and low frequency signals are reflected from the crack, back to the borehole, as shown by FIG. 2*b*.

FIGS. 3*a*-3*c* show an example detection process used to distinguish between linear and nonlinear scatters. FIG. 3*a* shows an arrangement similar to FIG. 1, where a crack (nonlinear feature) is located at position "A" and a void (linear feature) is located at position "B." FIGS. 3*b* and 3*c* show how the detection process is used to determine if a scatterer is a crack or not. The top plot of FIG. 3*b* shows a plot of stress (arbitrary units) versus time (arbitrary units) and the bottom plot of FIG. 3*b* shows a plot of amplitude (arbitrary units) versus time (arbitrary units) for signals returned from the crack located at position "A" where the low frequency signal has been removed by application of a high-pass filter. The top plot of FIG. 3*c* shows a plot of stress (arbitrary units) versus time (arbitrary units) and the bottom plot of FIG. 3*c* shows a plot of amplitude (arbitrary units) versus time (arbitrary units) for signals returned from the void located at position "B." The top plot of FIG. 3*b* shows the reflected and detected low frequency vibration with the high frequency pulses sitting atop of it. The bottom plot of FIG. 3b shows the same signal as the top plot of FIG. 3b after the signal has been high-pass filtered to eliminate the low frequency wave. A time amplitude modulated returned signal indicates that a nonlinear feature has been detected. For a linear feature, such as the void at position "B," if the same procedure is applied, there is no modulation of the amplitude in the reflected pulses from the linear feature.

In some aspects, a two-way time delay from the reflector, whether linear or nonlinear, can be obtained by standard cross-correlation of the source pulse with the reflected pulse. In this aspect, the first sequence of high frequency pulses can be either chirped or coded or both chirped and coded. Moreover, the first sequence of high frequency pulses can be modulated, wherein the modulation can include a modulation of an amplitude, a phase or a period of the pulse. If the linear velocity of the medium is known from other borehole measurement techniques, the distance to the nonlinear feature can be obtained. In some aspects, where the high frequency pulses are substantially non-directional, the azimuth of the reflector can be obtained by decomposition of the signals recorded by three component receivers. Repetition of the above steps at a given depth for different azimuths of the stringer and at different depths will provide a 3D image of the scattering structure and distinguish which scatterers are linear and which are not.

FIG. 4 shows an example arrangement for investigating cracks and other damage that are oriented perpendicular or substantially perpendicular to the borehole. In this aspect, probing and imaging nonlinear features that can be sensed by refracted waves running parallel to the borehole, for instance cracks oriented perpendicular to the borehole. As in the arrangement of FIG. 1, the borehole can be drilled in a variety of inclinations, such as vertical, inclined or horizontal, and embedded in a rock formation. Material 415 surrounding borehole 410 can include damage 430 that runs perpendicular or substantially perpendicular to borehole 410. As used herein, the term "substantially perpendicular" will mean almost perpendicular, but diverging or converging slightly. One or more transducers 405 are arranged to generate a low frequency or "pump" wave and oriented such that the wave propagates along the longitudinal axis of borehole 410. The low frequency wave or vibration can propagate upward/downward along the longitudinal axis of borehole 410 as tube or refracted waves. As in the arrangement of FIG. 1, since the low frequency waves propagate along the borehole, flexibility in the disposition of transducer 405 within borehole 410 is feasible, as long as the low frequency wave induces a small elastic nonlinearity next to borehole 410 in the material 415 as a result of particle motion in the surrounding material parallel to the borehole axis. In some aspects, transducer 405 are arranged to generate the low frequency wave intermittently, such that transducer 405 will have time periods when it is actively generating the low frequency wave and time periods when it is not actively generating the low frequency wave. The cycle time for transducer 405 can be controlled to optimize the operation of this arrangement One or more transducers 420 can be arranged longitudinally within borehole 410 to generate a sequence of high frequency pulses, or "probe" pulses, contemporaneously with the low frequency wave. In some aspects, transducer 420 can operate continuously during operation of this arrangement. In some aspects, the sequence of high frequency pulses can be a compressional and/or shear wave source. Transducers 420 can be arranged to operate with a repetition rate of at least 10 times for each pump wave cycle, emits bursts of high frequency, 10-1000 times that of the pump. These high frequency pulses propagate parallel or longitudinally to borehole 410 and as both refracted and direct waves, as well as scattered waves in material 415. The refracted probe pulses traveling parallel to the borehole within material 415 are of particular interest in this aspect. If the pump wave has sufficient amplitude to induce crack nonlinearity (generally greater than $10^{-6}$ strain amplitude, but increased effective pressure requires larger dynamic wave strain amplitudes), the pump wave will cause existing cracks or fissures in material 415 that are oriented approximately perpendicular to borehole 410 to exhibit strongly non-linear behavior in addition to any inherent non-linearity of the material itself. Transducer 420 can be arranged to emit a sequence of bursts or pulses to probe for nonlinearity induced by the low frequency waves generated by transducer 405. If a crack is present it creates what is known as a softening nonlinearity. The softening nonlinearity is manifest by wave harmonics, but more importantly, by local changes in formation velocity during the dilatational part of the low frequency cycle from transducer 420 to receiver 425. Changes in velocity are used to infer the presence of a crack. Normally, during the compressional phase, the wave velocity sensed by the probe pulses decreases proportionally to the amplitude and phase of the low frequency wave. In most instances, cracks and/or rocks may undergo softening nonlinearity induced by the interaction of the pump wave on the features that may experience the nonlinear behavior. This means that for the pump wave minimum amplitude (zero phase, amplitude equals zero) there is no change in velocity. The velocity decrease is progressively larger as the pump wave phase approaches the compression maximum amplitude. During the dilatational phase, the wave velocity progressively increases as the pump wave approaches maximum dilation amplitude. When cracks are present the velocity changes during the dilatational cycle are more pronounced and can be used to determine if cracks are present. In other instances, the cracks and/or rocks may undergo a hardening nonlinearity where the low frequency compression phase causes the probe pulses to increase in speed as they traverse the features undergoing the nonlinear response. The velocity changes are measured relative to pulse propagation velocities measured with the low-frequency pump source silent. This measurement gives the linear wavespeed of the formation from source to receiver(s).

One or more receivers 425 can be arranged within borehole 410 to record the vibration signal plus the ultrasonic pulses. Although four receivers are shown (Rx1, Rx2, Rx3 Rx4), this is only illustrative since more or fewer than four may be used. Receivers 425 can be locked to the borehole side or not, and individual elements of the array may record three components so that azimuth can be inferred. If more receivers are used, a longer portion of borehole 410 can be probed using the multiple receivers. In instances where more than one receiver is used, the change in wave speed and therefore the nonlinearity can be determined from successive receiver pairs. This can be done by correlating one receiver with another receiver during a pump wave cycle where each preceding receiver can be treated as a reference to obtain the nonlinearity between itself and the next receiver, In this arrangement, a relative change in velocity between the presence of cracks can be determined and used to distinguish cracks from other reflecting interfaces such as formation boundaries, because only cracks create the strong non-linear effect on velocity that depends on pump amplitude. The nonlinear attenuation can also be used as redundant information for inferring the presence of a crack. Pump wave harmonics can be used in addition to velocity and attenuation changes to aid in the determination of the presence of cracks and formation nonlinearity.

Processing the sequence of the high frequency refracted arrival pulse signals recorded by receiver 425 can give the full elastic nonlinear response of the formation near the borehole for a given wave path.

The signal processing requires measuring a pulse signal obtained without the vibration source. This signal gives the linear time delay and velocity of the medium since the distance between the source and receivers are known. This signal is cross-correlated with each signal of the sequence of pulse signals emitted when the vibration is in the formation.

The correlation output gives the change in velocity with vibration pressure. Since the wave path length is known from pulse source to receivers, and assuming a medium density obtained from other borehole logging procedures, the modulus as a function of pressure can be obtained. From this pressure derivative, the total nonlinearity of the medium can be obtained by using a model, for instance the Preisach-Mayergoyz (PM) space theory of elasticity as is known in the art. Other suitable models may also be used.

Repetition of the above steps at a given depth for different azimuths and frequencies within borehole 410 and at different depths can provide a 3D annular image of the velocity and modulus, and nonlinear velocity and modulus of the formation. In particular, cracks oriented perpendicular to the borehole will give a large nonlinear signature. This arrangement can determine all the nonlinear moduli simultaneously including the nonlinear moduli in tension and compression.

Operation of this arrangement is similar to applying a quasistatic, progressively increasing load while time-of-flight is measured across or along the sample at each load interval. This allows dynamic strains ($10^{-9}$-$10^{-5}$) to be explored and both tension and compression can be probed and the entire material nonlinearity is measured at once. The higher order nonlinearity is hysteretic in nature and very sensitive to the effects of fluids and mechanical damage.

FIGS. 5a to 5e show an example graphic illustration of the operation of the arrangement of FIG. 4. In this example, ultrasonic velocity and vibrational strain modulation are shown. FIG. 5a shows an individual pulse, and FIG. 5b shows a regular sequence of compressional high frequency pulses that can be emitted from transducer 420. If the pump source is silent, a similar regular sequence of pulses may be recorded at any of the elements of receiver array 425. FIG. 5c shows two periods of a low frequency vibration that can be generated by the compressional source 405. In this example the portion of the vibration having a positive amplitude on the figure is a compressional phase of the vibration and the portion of the vibration have a negative amplitude is a dilatational phase of the vibration. The summation of the two emitted signals of FIGS. 5b and 5c, depicted as FIG. 5d, is recorded at receiver 425. Since the speed of refracted waves 435 varies through the pump wave cycle, the received refracted pulses do not arrive regularly because their velocity varies with compressional and dilatational strain. Wave speed can be measured throughout a vibration cycle in both tension and compression in this manner. Similar recordings are made at the individual elements of receiver array 425. The recorded wave train of FIG. 5d may be filtered to remove the low frequency wave of 5c, leaving the irregular pulse sequence colored black on FIG. 5e. The regular pulse sequence of FIG. 5c is shown for reference, shaded gray, to highlight the modulation of the receiver pulse sequence. During compression, the ultrasonic wave decreases in velocity with a minimum at the peak pump compression. The maximum velocity is measured during peak dilatation. The above discussion is relevant for softening nonlinearity; however, as described above, certain material may undergo hardening nonlinearity where the pump compression cause the probe pulses to increase in speed. In this hardening case, the plots would indicate velocity changes in the opposite sense. From wave speed change through a wave strain cycle, all of the nonlinear coefficients may be defined. Multiple vibration cycles provide very good accuracy and precision of the change in wave speed with strain and therefore in the determination of the nonlinear coefficients.

The total time delay is, TDtotal(i)=TD(i)−TD(1), where TDtotal(i) are the sequence of ultrasonic pulses obtained through a pump wave cycle. The delay of each is obtained by applying cross-correlation using the reference signal TD(1). The wave velocity c is, $$c = \sqrt{\frac{M}{\rho}} = \frac{L}{TD} \quad (1)$$

where $M=K+4/3\mu$ and L is propagation distance, TD the elapsed time, M, K and $\mu$ are the compressional, bulk and shear moduli, and $\rho$ the bulk density of the medium. For small amplitude/velocity variations, $$\frac{\Delta c}{c_0} = -\frac{\Delta TD}{TD_0} + \frac{\Delta L}{L_0} = \frac{\Delta M}{2M_0} - \frac{\Delta \rho}{2\rho_0} \quad (2)$$

where $$\Delta TD \equiv TDtotal \cong -\frac{TD_0}{2}\frac{\Delta M}{M_0} \approx \frac{L}{2\rho_0 c_0^3}\Delta M \quad (3)$$

and $$\frac{\Delta M}{M_0} = -\beta \varepsilon_{LF} - \delta \varepsilon_{LF}^2 - \alpha(\Delta \varepsilon_{LF} + \varepsilon_{LF} \text{sign}(\dot{\varepsilon}_{LF})) \quad (4)$$

where $\alpha$ is the hysteretic nonlinear parameter, $\epsilon_{LF}$ is the instantaneous strain of the pump wave, and $\dot{\epsilon}_{LF}$ is the instantaneous strain derivative with time, $\Delta \epsilon_{LF}$ is the maximum strain excursion in a cycle and where $\beta$ and $\delta$ are the third and fourth order nonlinear coefficients, respectively and sign($\dot{\epsilon}_{LF}$) is from the sign of the strain derivative, and details of which can be found in Renaud, G., S. Callé, and M. Defontaine, Remote dynamic acoustoelastic testing: Elastic and dissipative nonlinearities measured under hydrostatoc tension and compression and Van Den Abeele, K. E.-A., A. Sutin, J. Carmeliet, and P. Johnson, Micro-damage diagnostics using nonlinear elastic wave spectroscopy (NEWS), *NDT&E International* 34, 239-248 (2001), both of which are hereby incorporated by references in their entirety.

By applying this arrangement at each depth and azimuth with borehole 410, the full nonlinearity of the near-borehole may be obtained, and by standard imaging methods that may be based on refraction of waveform migration, a nonlinear image of the near-borehole region may be obtained.

FIGS. 6a to 6c show an example of received signals for the arrangement of FIG. 4 in the case of softening non-linearity. The material around the borehole has constant properties over the vertical extent of the receiver array 425, and a very thin open fracture 430 crosses the borehole. FIG. 6a shows an amplitude verses time plot for signals received by receiver 425 when transducer 405 is silent. FIG. 6b shows an amplitude verses time plot for signals received by receiver 425 during maximum low frequency compression. FIG. 6c shows an amplitude verses time plot for signals received by receiver

425 during maximum low frequency dilatation. For the three plots, the time axis is with respect to receiver Rx1. To simplify the following discussion, the amplitude loss due to attenuation is ignored. At the reference condition, shown in FIG. 6*a*, with transducer 405 silent, assuming homogeneous rock and that the fracture does not influence the rock stiffness, all returned signals will be displaced relative to each other by an amount related to the rock velocity and receiver spacing. During the compression part of the pump wave cycle, as shown in FIG. 6*b*, there is a decrease in wave speed through the material as it softens (exhibiting softening nonlinearity) so the time lag between successive signal increases. During the dilatation part of the cycle, as shown in FIG. 6*c*, there is an increase in wave speed through the material so the time delay between successive receivers decreases slightly. During the compressional part of the cycle, there is a decrease in wavespeed through the materials so the time delay between successive receivers increases slightly.

The various arrangements described in detail above can be used in many applications derived from imaging around the borehole. For example, the above-described acoustic beam sources can be used for various evaluation of natural fractures, mapping of vugs, nodules or other inhomogeneities, evaluation of the presence and properties of the cement sheath between one or more casing strings and the formation around a cased well, mapping fluid invasion from the borehole and assessment of the mechanical integrity of the formation around the wellbore, in particular any alteration or localized mechanical damage caused by the near wellbore stress concentration.

Although the invention has been described in detail for the purpose of illustration based on what is currently considered to be a variety of useful embodiments, it is to be understood that such detail is solely for that purpose and that the invention is not limited to the disclosed embodiments, but, on the contrary, is intended to cover modifications and equivalent arrangements that are within the spirit and scope of the appended claims. For example, though reference is made herein to a computer, this may include a general purpose computer, a purpose-built computer, an ASIC including machine executable instructions and programmed to execute the methods, a computer array or network, or other appropriate computing device. For example, the data collected by the receivers could undergo some processing and are either stored in memory in the tool, or transmitted up hole for further processing and storage. As a further example, it is to be understood that the present invention contemplates that, to the extent possible, one or more features of any embodiment can be combined with one or more features of any other embodiment.

What is claimed is:

1. A method for investigating material surrounding a borehole, the method comprising:
   generating a first lower frequency acoustic wave within the borehole, wherein the first lower frequency acoustic wave induces a linear distortion in one or more features of inhomogeneities in the material surrounding the borehole and a nonlinear distortion in one or more features of inhomogeneities in the material surrounding the borehole that are substantially perpendicular to a radius of the borehole;
   directing a first sequence of higher frequency pulses in a direction perpendicular with respect to the longitudinal axis of the borehole into the material contemporaneously with the first acoustic wave; and
   receiving at one or more receivers positionable in the borehole one or more second higher frequency pulses produced by an interaction between the first sequence of higher frequency pulses and the one or more features of inhomogeneities in the material that are undergoing the linear distortion and the nonlinear distortion due to the first lower frequency acoustic wave.

2. The method according to claim 1, wherein the second higher frequency pulses are received at the one or more receivers if the first sequence of higher frequency pulses encounters the one or more features of inhomogeneities within the material with a contrast in acoustic impedance resulting in reflection or backscattering of energy to the borehole.

3. The method according to claim 2, wherein the second higher frequency pulses are received at the one or more receivers if the first sequence of higher frequency pulses encounters the one or more features of inhomogeneities that is oriented such that the one or more feature of inhomogeneities directs energy back to the borehole while undergoing the distortion due to the first lower frequency acoustic wave such that the distortion alters the contrast in the acoustic impedance during a cycle of the lower frequency acoustic wave.

4. The method according to claim 1, wherein the first acoustic wave and the first sequence of higher frequency pulses are generated by a compressional wave source, a shear wave source or both.

5. The method according to claim 4, wherein a source of the first acoustic wave includes a vibrating member that is configured to induce the linear and nonlinear elastic distortions in the material.

6. The method according to claim 1, wherein the one or more receivers are arranged in an array in the borehole.

7. The method according to claim 1, wherein the one or more receivers are configured to record one or more directional components of the one or more second higher frequency pulses.

8. The method according to claim 1, further comprising repeating the generating the first acoustic wave and the directing the first sequence of higher frequency pulses at different azimuth orientations and at different depths within the borehole to produce three-dimensional images of linear and nonlinear elastic features of inhomogeneities of the material surrounding the borehole.

9. The method according to claim 1, wherein the material surrounding the borehole is selected from the group consisting of: cement, casing, rock formations, fluids in or surrounding the borehole or combinations thereof.

10. The method according to claim 1, wherein the received second higher frequency pulses has properties that depend on a phase of the lower frequency wave at a location and a time at which the first sequence of higher frequency pulses are reflected by the material.

11. The method according to claim 1, further comprising determining whether the material includes a linear reflector or a nonlinear reflector based on the received one or more second higher frequency pulses.

12. The method according to claim 11, further comprising filtering the received one or more second higher frequency pulses.

13. The method according to claim 12, wherein the filter includes a higher pass filter that is arranged to isolate high frequency components from the received one or more second higher frequency pulses.

14. The method according to claim 11, further comprising determining an amplitude change with time of the filtered one or more second higher frequency pulses.

15. The method according to claim 1, wherein the first sequence of higher frequency pulses are either chirped or coded or both chirped and coded.

16. The method according to claim 1, wherein the first sequence of higher frequency pulses is modulated, and the modulation is selected from the group consisting of: amplitude, phase, period or any combination thereof.

17. The method according to claim 1, wherein between five and 100 first frequency pulses are emitted per cycle of the lower frequency wave, and the first higher frequency pulses have a frequency at least ten times a frequency of the low frequency wave.

18. The method according to claim 1, further comprising determining a radial distance to the one or more features based upon a first time at which the first sequence of higher frequency pulses were transmitted, a second time at which the second sequence of higher frequency pulses where received and an estimated velocity of sound along the path of the first sequence of higher frequency pulses and along the path of the second higher frequency pulses.

19. The method according to claim 18, wherein the determining includes computing a cross-correlation of the first sequence of higher frequency pulses and the second higher frequency pulses.

20. The method according to claim 1, wherein the second higher frequency pulses are received at the one or more receivers if the first sequence of higher frequency pulses encounters a nonlinear elastic feature in the material that is oriented such that feature directs energy back while undergoing a shearing distortion.

21. An apparatus for investigating material surrounding a borehole, the apparatus comprising:
    a first acoustic wave source positionable in the borehole and configured to generate a first acoustic wave having a lower frequency into the material to induce a linear distortion in one or more features of inhomogeneities in the material surrounding the borehole and a nonlinear distortion in one or more features of inhomogeneities in the material that are substantially parallel to a longitudinal axis of the borehole;
    a source positionable in the borehole and configured to direct a first sequence of higher frequency pulses in a perpendicular direction relative to the longitudinal axis of the borehole into the material contemporaneously with the first acoustic wave; and
    one or more receivers positionable in the borehole and configured to receive one or more second higher frequency pulses produced by an interaction between the first sequence of higher frequency pulses and the one or more features of inhomogeneities in the material that are undergoing the linear distortion and the nonlinear distortion due to the first acoustic wave.

22. The apparatus according to claim 21, wherein second higher frequency pulses are received at the one or more receivers if the first sequence of higher frequency pulses encounters the one or more features of inhomogeneities within the material with a contrast in acoustic impedance resulting in reflection or backscattering of energy to the borehole.

23. The apparatus according to claim 22, wherein the second higher frequency pulses are received at the one or more receivers if the first sequence of higher frequency pulses encounters the one or more features of inhomogeneities that are oriented such that the one or more features directs energy back to the borehole while undergoing the distortion due to the first lower frequency acoustic wave such that the distortion alters the contrast in the acoustic impedance during a cycle of the lower frequency acoustic wave.

24. The apparatus according to claim 21, wherein the first acoustic wave source and the source of the first sequence of higher frequency pulses are configured to produce a compressional wave, a shear wave or both, 25. The apparatus according to claim 24, wherein the first acoustic wave source includes a vibrating member that is configured to induce the linear and the nonlinear elastic distortions in the material.

26. The apparatus according to claim 21, wherein the one or more receivers are arranged in an array in the borehole.

27. The apparatus according to claim 21, wherein the one or more receivers are configured to record one or more directional components of the one or more second higher frequency pulses.

28. The apparatus according to claim 21, further comprising a processor in communication with a memory having instructions stored therein which, when executed, is configured to determine a radial distance from the borehole to the one or more features of inhomogeneities based on the velocity of sound along the path of the first sequence of higher frequency pulses and along the path of the second higher frequency pulses.

29. The apparatus according to claim 21, further comprising a processor in communication with a memory having instructions stored therein which, when executed, is configured to produce one or more three-dimensional images of the material based on repeated acoustic wave penetrations into the material at different azimuth orientations and at different depths within the borehole.

30. The apparatus according to claim 21, wherein the material surrounding the borehole is selected from the group consisting of: cement, casing, rock formations, fluids in or surrounding the borehole or combinations thereof.

31. The apparatus according to claim 21, further comprising a processor in communication with a memory having machine executable instructions stored therein which, when executed, causes the processor to determine whether the material includes a linear reflector or a nonlinear reflector based on the received one or more second higher frequency pulses.

32. The apparatus according to claim 31, further comprising a filter arranged to filter the received one or more second higher frequency pulses.

33. The apparatus according to claim 32, wherein the filter includes a high pass filter that is arranged to isolate higher frequency components from the received one or more second higher frequency pulses.

34. The apparatus according to claim 32, wherein the processor is arranged to determine an amplitude change with time of the filtered one or more second higher frequency pulses.

35. The apparatus according to claim 31, further comprising an encoder arranged to encode the first sequence of higher frequency pulses with a time-varying signature by introducing a time varying component including chirping or frequency sweeps.

36. The apparatus according to claim 35, wherein the processor uses the encoded first sequence of higher frequency pulses to measure a time-of-flight between the first sequence and the received second sequence.

37. The apparatus according to claim 35, wherein the time-varying signature is selected from a change with time in the group consisting of: amplitude, phase, period or any combination thereof.

38. The apparatus according to claim 21, wherein between five and 100 first frequency pulses are emitted per cycle of the low frequency wave, and the first higher frequency pulses have a frequency at least ten times a frequency of the lower frequency wave.

39. The apparatus according to claim 31, wherein the processor is arranged to determine a radial distance to the material based upon a first time at which the first sequence of higher frequency pulses were transmitted, a second time at which the second sequence of higher frequency pulses where received and an estimated velocity of sound of the material.

40. The apparatus according to claim 39, wherein the radial distance is determined by computing a cross-correlation in a time domain of the first sequence of higher frequency pulses and the second higher frequency pulses.

* * * * *